Jan. 19, 1954     R. B. HOWELL     2,666,612
CHILD'S DISH HOLDER

Filed May 11, 1949     2 Sheets-Sheet 1

INVENTOR.
Richard B. Howell
BY
Greek Wells

Jan. 19, 1954 R. B. HOWELL 2,666,612
CHILD'S DISH HOLDER
Filed May 11, 1949 2 Sheets-Sheet 2
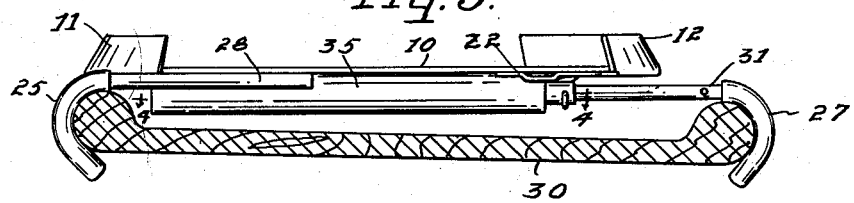
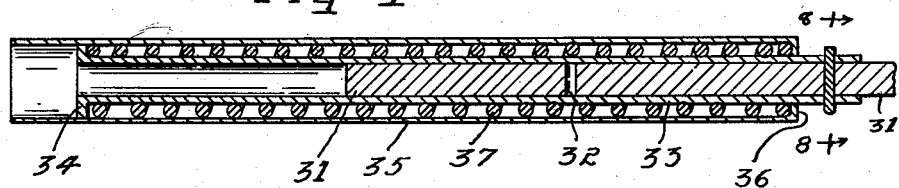
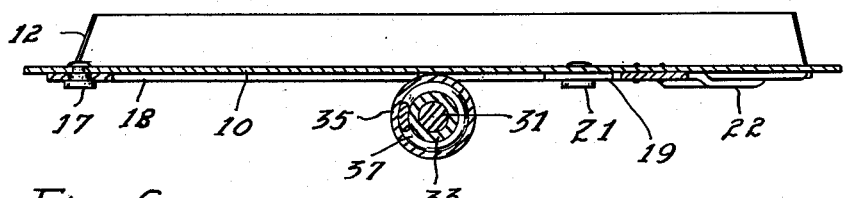
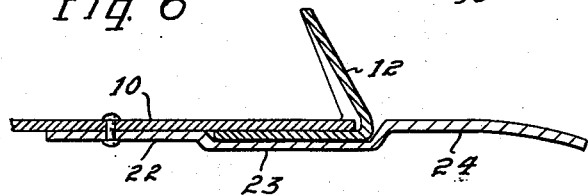
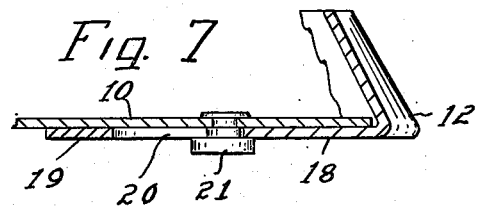
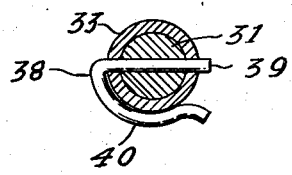
INVENTOR.
Richard B. Howell
BY Patented Jan. 19, 1954

2,666,612

UNITED STATES PATENT OFFICE 2,666,612

CHILD'S DISH HOLDER

Richard B. Howell, Milwaukee, Wis., assignor to The Kendall Corporation, Milwaukee, Wis., a corporation of Wisconsin Application May 11, 1949, Serial No. 92,631

3 Claims. (Cl. 248—310)

My invention relates to improvements in a child's dish holder.

It is the principal purpose of my invention to provide a simple, sanitary dish holder that can be utilized to attach a child's dish to the tray of the high chair in such a way that the child cannot tip the dish or remove it. The holder is of such nature as to cooperate with a dish having an outwardly flared base and hold the dish clamped against a base plate that is removably mountable on the high chair tray.

One of the considerations in a device of this character is sanitation. According to my invention the entire clamping device which holds the dish is of such construction that it can be cleaned and can be kept as sanitary as any ordinary kitchen utensil.

More particularly it is the purpose of my invention to provide a child's dish holder comprising a mounting plate having means to clamp the base of a dish thereto together with three supporting bars having down turned hooks at their free ends. The supporting bars are arranged with one extended from the mounting plate in a direction opposite to the other two bars, the one bar being extensible and resiliently urged by a spring construction beneath the plate toward the other two bars. The nature and advantages of my invention will appear more fully from the following description and the accompanying drawings wherein a preferred embodiment thereof is shown. It should be understood however, that the drawings and description are illustrative only and should not be considered as limiting the invention except insofar as it is limited by the claims.

In the drawings:

Figure 3 is a view in side elevation of the dish holder, the holder being mounted on a tray which is illustrated in section;

Figure 4 is an enlarged sectional view taken substantially on the line 4—4 of Figure 3;

Figure 5 is a sectional view taken on the line 5—5 of Figure 1, the supporting tray being left out;

Figure 6 is an enlarged fragmentary sectional view taken on the line 6—6 of Figure 1;

Figure 7 is an enlarged fragmentary sectional view taken on the line 7—7 of Figure 1; and Figure 8 is a sectional view taken on the line 8—8 of Figure 4.

Figure 1:
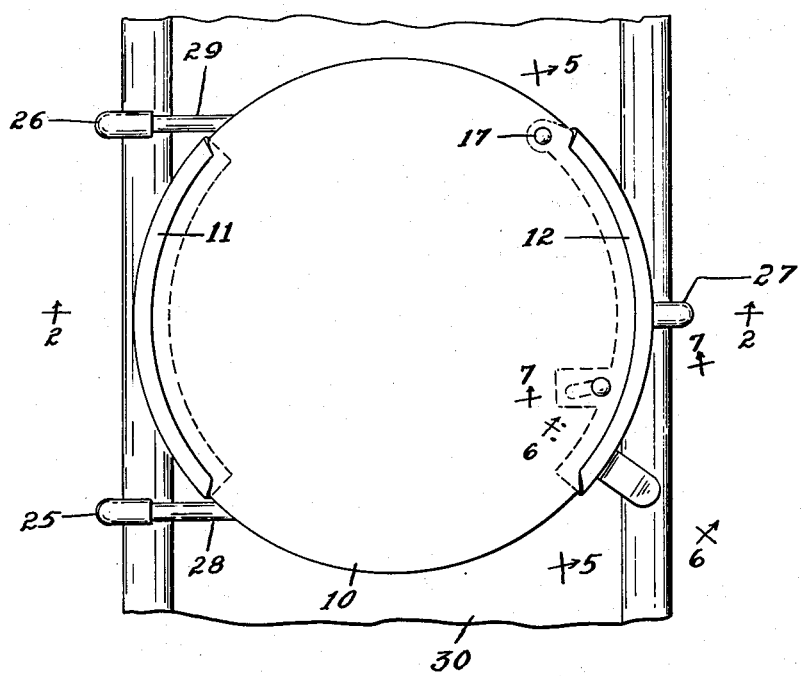
Figure 1 is a plan view of my improved child's dish holder showing it applied to the tray of a high chair or a similar support.

Referring now to the drawings my improved dish holder comprises a base 10 which is preferably a plate of metal which does not rust or corrode. The base 10 has a clamp 11 and a clamp 12 oppositely disposed thereon and curved to follow the circular outline of the base 10. The clamp 11 is fixed to the plate 10 and has its clamping portion 13 extended inwardly over the plate to receive the lower portion 14 of a dish 15. The plate 12 has its clamping portion 16 extended inwardly toward the clamp 11 so as to engage the lower portion 14 of the dish 15. The clamp 12 is pivoted to the base 10 by a pivot pin 17 so that it may move away from the clamp 11 to receive a dish between the clamps. The clamp 12 has its lower portion 18 overlying the base 10. The portion 18 is provided with an ear 19 which has an elongated slot 20 therein. A headed pin 21 is secured in the base 10 and passes through the slot 20 so as to limit the outward swinging movement of the clamp 12 so that the clamp can swing outward far enough to permit the dish to seat between the clamps 11 and 12.

The clamp 12 is releasably held in its clamping position by a spring latch 22 that is secured to the base 10. The latch 22 has a downwardly offset seat 23 and a finger piece 24. Downward pressure on the finger piece 24 will permit the latch 22 to swing outward.

Figure 2:
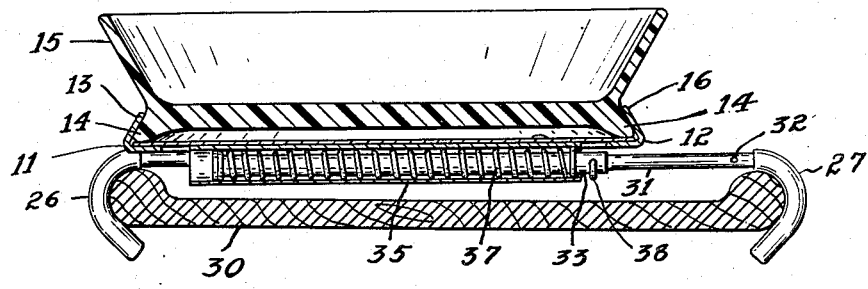
Figure 2 is a sectional view taken on the line 2—2 of Figure 1, but showing the child's dish in place and showing the device as applied to a wider tray or support.

The base 10 is also provided with oppositely disposed hooks 25, 26 and 27. Preferably the hooks 25 and 26 are constructed by welding rods 28 and 29 to the underside of the base 10 and bending the free ends of these rods to hook shape. The hooked parts of the rods preferably are covered with a rubber or other resilient covering so they will not mar a support such as the tray 30 of a child's high chair. The hook 27 has a similar rubber or resilient coating thereon and has a long rod 31 integral therewith. The rod 31 has spaced apertures 32 therein. The rod 31 extends into a tube 33 which has a flange 34 at one end thereof. A spring housing tube 35 is secured on the underside of the base 10 by welding or other means. The spring housing tube 35 has an inturned flange 36 at one end. The flange 36 fits closely around the tube 33. A spring 37 is housed between the tubes 33 and 35 and is under compression between the flanges 34 and 36. The spring 37 thus tends to force the tube 33 to the left as viewed in Figures 2 and 4.

The apertures 32 in the rod 31 are utilized to adjust the extent to which the rod 31 projects from the tube 33. The tube 33 is apertured at the rod receiving end to receive a spring connector 38. As shown best in Figure 8, this connector has a straight portion 39 that extends through the tube 33 and one of the apertures 32 in the rod 31. The connector 38 has a curved portion 40 that is adapted to snap over the tube 33 when the portion 39 is inserted through the aperture as described. The connector 38 serves as a limiting stop, limiting the amount of travel of the tube 33 in a direction to draw the hook 27 toward the hooks 25 and 26. The hooks 25 and 26 are in effect one hook disposed opposite to the hook 27.

The operation of my improved dish holder is believed to be evident from the foregoing description. It is also quite obvious that the device is of such nature that it may be readily cleaned in the same fashion as kitchen utensils. All of the materials used in construction are of a noncorrosive character so that the device may be kept clean. Moreover, the tubes 33 and 35 may be taken apart and cleaned by removal of the connector 38 and separation of the rod 31 from the tube 33. I use a single base member 10 in the form of a circular plate, on which all of the clamps and hooks are carried. This construction provides a simple and economical device to manufacture.

Having thus described my invention, I claim:

1. In combination, a dish supporting base plate, means secured on said plate for fastening it on a support such as a high chair tray, a pair of elongated curved dish securing clamps on said base plate, one clamp having one end pivotally attached to the base plate, and the other end secured to the base plate for limited sliding movement toward and away from the opposite clamp, and a spring latch on the base plate for holding said last named end of the movable clamp.

2. In combination, a dish supporting base plate, means to releasably secure a dish thereon, and hooks oppositely disposed on the base plate and projecting downwardly to receive a support for said base plate therebetween, a spring housing tube on the underside of said base plate, a coiled spring therein, a member carrying one of said hooks and extending into said tube, a spring stop on the member at the end remote from said hook, a spring stop on the tube end nearest the hook, said spring being under compression between said stops.

3. In combination, a dish base, and hooks oppositely disposed on the base and projecting downwardly to receive a support for said base therebetween, a spring housing tube on the under side of said base, a coiled spring therein, a member carrying one of said hooks and extending into said tube, a spring stop on the member at the end remote from said hook, a spring stop on the tube end nearest the hook, said spring being under compression between said stops, said member comprising a tube and a rod slidable therein, spaced apertures in said rod and a removable connector extending through the last named tube and a rod aperture.

RICHARD B. HOWELL.

References Cited in the file of this patent

UNITED STATES PATENTS

| Number | Name | Date |
|---|---|---|
| 1,049,974 | Baillie | Jan. 7, 1913 |
| 1,455,026 | Jorgensen et al. | May 15, 1923 |
| 1,773,676 | Hennessey | Aug. 19, 1930 |